United States Patent Office 3,814,707
Patented June 4, 1974

---

3,814,707
BICYCLIC AMIDINE CATALYSTS IN POLY-URETHANE FOAM PROCESS
Friedrich Möller, Cornelius Muhlhausen, and Günter Hauptmann, Leverkusen, Germany, assignors to Bayer Aktiengesellschaft, Leverkusen, Germany
No Drawing. Filed Mar. 13, 1968, Ser. No. 712,628
Claims priority, application West Germany, Mar. 15, 1967, F 51,818
Int. Cl. C08g 22/38, 22/46
U.S. Cl. 260—2.5 AC                                  7 Claims

ABSTRACT OF THE DISCLOSURE

Bicyclic amidines are used as catalysts to promote the reaction between hydroxyl compounds and organic isocyanates. The bicyclic amidines have the general formula

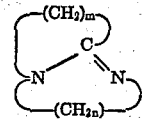

wherein $m$ is a whole number from 3 to 7 and $n$ is a whole number from 2 to 4.

---

This invention relates to the preparation of polyurethane plastics and more particularly to the reaction between hydroxyl compounds and organic isocyanates in the presence of catalyst.

It is well known that polyurethanes are usually prepared by the reaction of polyhydroxyl compounds with polyisocyanates. If the reaction is carried out in the absence of water the substances obtained are homogeneous, whereas the addition of water causes foaming due to the liberation of $CO_2$ resulting from the reaction between isocyanate groups and water. The addition of aliphatic low-boiling halogenated hydrocarbons can also be used for the preparation of foams.

It is also known that the reaction velocity in the preparation of the polyurethanes may be increased by the activators such as tertiary amines or inorganic or organic compounds of iron, titanium or tin. This method is used to obtain more economical operating times or to take advantage of particular technical effects. For example, in the preparation of foam plastics, it is important to adjust the solidification and foaming process with respect to each other in order to obtain satisfactory and reproducible foams. When preparing homogeneous materials, activation is particularly desirable if, for example, one wished to coat surfaces, because the liquid reaction mass must then harden as quickly as possible after it has been sprayed, in order that it should not run.

It is, therefore, an object of this invention to provide an improved process for the preparation of polyurethane and more particularly an improved catalyst for the reaction between a hydroxyl group and an isocyanate group. Another object of this invention is to provide an improved process for the preparation of foamed plastics by reaction between polyhydroxyl compounds and polyisocyanates in the presence of a blowing agent. A further object of this invention is to provide an improved method of adjusting the rate of reaction between hydroxyl compounds and isocyanato compounds. Still another object of this invention is to provide an improved method of activating the reaction between organic polyisocyanates and polyhydroxyl compounds particularly when they are used to coat various substrates.

The foregoing objects and others which will become apparent from the following descriptions are accomplished in accordance with the invention, generally speaking, by providing for the catalysis of the reaction between an organic compound containing a hydroxyl group and a compound containing an isocyanate group with a bicyclic amidine having the general formula

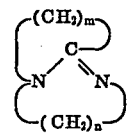

in which $m$ is a whole number from 3 to 7 and $n$ is a whole number from 2 to 4.

Thus, it has now been found that bicyclic amidines of the general formula:

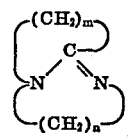

in which $m$ is a whole number from 3 to 7 and $n$ is a whole number from 2 to 4, very greatly accelerate the reaction between hydroxyl groups and isocyanate groups. A particular advantage which arises out of using these catalysts according to the invention is that they exhibit their maximum activity at moderately elevated temperatures, e.g. of about 60° C. This delayed activation is in many cases very desirable for the production of polyurethanes from polyhydroxyl compounds and organic polyisocyanates because a sufficient length of time is thereby available for carefully mixing the reaction components at room temperature. Since the reaction is exothermic, the temperature of the mixture rises, so that acceleration by the bicyclic amidines can now exert its full effect. In some cases, however, it is advantageous to add other activators as cocatalysts to the mixture of reactive components in addition to the catalysts to be used according to the invention, namely, tertiary amines and/or inorganic or organic compounds of tin, lead, titanium or iron, in order to accelerate the reaction right from the start and in order that the optimum temperature for the reactivity of the amidines is reached quickly.

An object of the invention is, therefore, to provide a process for the production of polyurethanes, including polyurethane foams, from polyhydroxyl compounds that have an average molecular weight of 400 to 5,000 polyisocyanates, catalysts and, if desired, water and/or other blowing agents, which process bicyclic amidines of the general formula

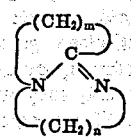

in which $m$ is an integer of 3 to 7 and $n$ is an integer of 2 to 4 are used as catalysts in a quantity of 0.1 to 5% by weight based on the polyhydroxyl compound.

Catalysts which are used according to the invention are bicyclic amidines, for example of the following constitution:

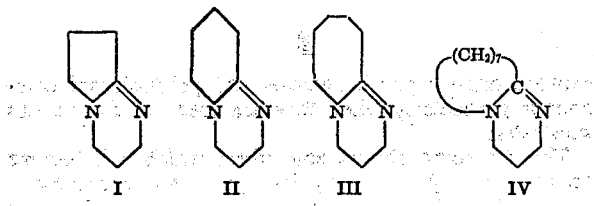

I  II  III  IV

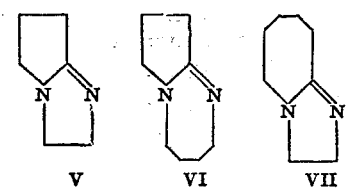

V  VI  VII

The catalysts according to the invention are as a rule used in a quantity of 0.1 to 5% by weight, based on the polyhydroxyl compound. They can be prepared by the manner described in French Pat. 1,491,791.

The following compounds for example may be used as polyhydroxyl compounds, polyethers containing two or more OH groups and having an average molecular weight of 400 to 5,000, such as polyethylene glycol, polypropylene glycol or polybutylene glycol, or mixtures thereof. One may also use linear or branched addition products obtained by the molecular addition of alkylene oxides such as ethylene oxide, propylene oxide, styrene oxide, epichlorohydrin or tetrahydrofuran to, for example, polyfunctional alcohols, amino alcohols, or amines. The following examples of suitable polyfunctional starting components to which alkylene oxides may be added ethylene glycol, 1,2-propylene glycol, trimethylolpropane, 1,2,4-butanetriol, glycerol, pentaerythritol and oligo and polysaccharides such as saccharose or starch; castor oil, ethanolamine, diethanolamine, triethanolamine, aniline, cyclohexylamine, ethylene diamines or alkylene diamines similar to ethylene diamine, tetra- or hexaethylene diamine or also ammonia may also have alkylene oxides added to them. Mixtures of linear and/or branched polyalkylene glycol ethers of different types may, of course, also be used. Hydroxyl-containing polythioethers of phenols which have been reacted with alkylene oxide, formaldehyde resins, hydrogenation products of copolymers of ethylene, olefins and carbon monoxide, and epoxy resins may also be used as polyhydroxyl compounds in the process according to the invention. Hydroxyl-containing compounds which have a molecular weight of 400 to 5,000 and which, in addition, also contain ether and/or ester and/or amide and/or urea and/or urethane and/or thioether groups may also be used as starting material. Polyesters that have at least two OH groups and an average molecular weight of 500 to 3,000 are also suitable, e.g. polyesters of adipic acid, sebacic acid, succinic acid or phthalic acid with ethylene glycol, propylene glycol, butylene glycol, trimethylolpropane or glycerol or mixtures thereof. Suitable polyisocyanates are, for example, the isomeric toluylene diisocyanates or mixtures thereof, hexamethylene diisocyanate, 4,4'- and 2,2'-diphenylmethane diisocyanate or mixtures thereof, diphenylmethane diisocyanate modified with carbodiimide, and crude diphenylmethane diisocyanate obtained by aniline formaldehyde condensation followed by phosgenation. Other examples of polyisocyanates which may be used in the process of the invention are m-xylylene diisocyanate, naphthylene-1,5-diisocyanate, dicyclohexylmethane-4,4'-diisocyanate and m- and p-phenylene diisocyanate.

Examples of tertiary amines and/or inorganic or organic compounds of tin, lead, titanium or iron which may also be used include tin(II)-chloride, tin(IV)-chloride, dibutyl tin dilaurate, tin(II)-octoate, lead naphthenate, ferric acetyl acetonate, titanium tetrachloride, dimethylbenzylamine, N - methyl-N'-(N,N-dimethylaminoethyl) piperazine, triethylenediamine, permethylated diethylenetriamine. These cocatalysts are generally used in a quantity of 0.1 to 5% by weight based on the polyhydroxyl compound.

To carry out the process, the polyhydroxyl compound is first mixed with the bicyclic amidine to be used according to the invention and if desired with another activator. Foam plastics are prepared by foaming from this mixture in known manner by reacting it with polyisocyanates in the presence of water and/or other blowing agents such as methylene chloride, trichlorofluoromethane, or dichlorodifluoromethane. According to a special embodiment of the invention, homogeneous polyurethanes are prepared by adding mineral drying agents such as zeolite to the mixture of polyhydroxyl compound and bicyclic amidine in order to bind small quantities of water. As a rule these mineral drying agents are added in amounts of 1 to 10% by weight, based on the polyhydroxyl compound. The isocyanate is then added to this mixture whereupon the mixture is poured into molds or onto surfaces. If the mixture of reactive components is to be sprayed onto surfaces, it is very advantageous to add 1 to 5% by weight of an alkanolamine that has at least one primary or secondary amino group, based on the polyhydroxyl compound, to the polyhydroxyl mixture before the polyisocyanate is added. Examples of these alkanolamines are diethanolamine, ethanolamine, 4-aminocyclohexanol, di-(3-hydroxypropyl)amine. As a result of this, the viscosity rises sharply when the polyisocyanate is added, and the reaction mixture will not run on vertical surfaces.

The ratio of reactive groups of the polyol mixture to the isocyanate group should be 1:08 to 1.5.

In the preparation of polyurethane foams according to the invention, one may, of course, also use the usual additives such as stabilizers, e.g. polyether-polysiloxanes, sulphonated castor oils, or their sodium salts, or anti-inflammatory additives such as reaction products of phosphoric acid or phosphorus acid and alkylene oxides. Both in the production of polyurethane foams and in the production of homogeneous polyurethanes, the polyhydroxyl and polyisocyanate components can be mixed either by hand or using suitable mixing machines.

The process according to the invention allows one to prepare homogeneous polyurethanes and polyurethane foams in a particularly economical and technically advantageous manner.

The polyurethanes of the invention are useful particularly for coating substrates such as wood, metal and the like. The polyurethane foams are useful for the preparation of cushions, insulation for the walls of dwellings and the like and the product which contains only one urethane group, i.e. from the reaction between an alcohol and a monoisocyanate are useful for example for the preparation of coating compositions where these masked isocyanates are then applied to a substrate and heated in order to release the alcohol and generate the isocyanate groups which reacts onto the substrate.

The invention is further illustrated by the following examples in which parts are by weight unless otherwise specified.

EXAMPLE 1

About 100 parts of a branched polyethylenepropylene ether glycol in which some of the OH groups are primary and which has a molecular weight of 4,500 are mixed with one part of the bicyclic amidine of structure III, one part of triethanolamine and four parts of water and to this are added 74 parts of the crude diphenylmethane diisocyanate obtained by aniline-formaldehyde condensation followed by phosgenation. After thorough mixing, the material is poured into molds, and a foam having the following physical properties is obtained:

Weight per unit volume: 40 kg./m.$^3$
Tensile strength: 0.8 kg. wt./cm.$^2$
Elongation at break: 55%
Resistance to compression at 40% deformation: 80 p./cm.$^2$
Impact elasticity: 45%

EXAMPLE 2

About 5 parts of zeolite and one part of a bicyclic amidine of structure III are added to a mixture of 65 parts of a polypropylene glycol of molecular weight 4,000 that contains three OH groups and 40 parts of a polypropylene glycol containing three OH groups and having an OH number of 350 to 400, and the components are thoroughly mixed together. To this mixture are added 56 parts of crude dimethylmethane diisocyanate obtained by aniline formaldehyde condensation followed by phosgenation. After the ingredients have been thoroughly mixed, the material is poured into molds or onto sheets and can be removed from the molds or sheets after about 10 minutes. The resulting polyurethane has the following physical properties:

Tensile strength: 157 kg. wt./cm.$^2$
Elongation at break: 48%
Hardness: 57 Shore D
Abrasion: 191 mm.$^3$ The reaction mixture is applied as a coating material by spraying, e.g. on vertical surfaces, one part by weight of diethanolamine is added to the above mixture of polyether, zeolite and bicyclic amidine.

EXAMPLE 3

92 parts by weight of a branched polyethylenepropylene ether glycol in which some of the OH groups are primary and which has an average molecular weight of 4500 are mixed with 0.6 parts by weight of the bicyclic amidine of structure III, 30 parts by weight of monofluoro trichloromethane as blowing agent and 8 parts by weight of ethylene glycol. Then 64 parts by weight of the crude diphenyl methane diisocyanate, obtained by aniline-formaldehyde condensation followed by phosgenation, are added. After thorough mixing the material is poured into molds. A foam is obtained having the following physical properties.

Weight per unit volume: 48 kg./m.$^3$
Tensile strength: 0.5 kp./cm.
Elongation at break: 50%
Resistance to compression at 40% deformation: 63 p./cm.$^2$
Starting time: 15 seconds
Rising time: 60 seconds
Setting time: 5 seconds

EXAMPLE 4

1 part by weight of diethanol amine and 1 part by weight of the bicyclic amidine of formula I are added to 100 parts by weight of the mixture of example 2 prepared from polypropylene glycols and zeolite. This mixture is passed continuously by means of a suitable metering equipment to a mixing apparatus, where it is mixed with crude diphenyl methane diisocyanate which was obtained by formaldehyde-aniline-condensation and phosgenation and which was also passed continuously to the mixing apparatus by means of a metering equipment. The resulting mixture is then sprayed onto surfaces of any form. It is preferred to use the diisocyanate in a molar excess of 10 to 30% over the reactive hydrogen atoms of the polyol mixture. The mixture of both the reactive components becomes so quickly solid that it even stays on vertical walls.

Instead of the bicyclic amidine of structure I the bicyclic amidines of structures II—VII can be used as well. Because of air inclusion in the spraying jet the resulting material contains closed micropores having been unable to escape because of the quick solidification of the mass. The resulting material has the following properties:

Weight per unit volume: 0.8 g./cm.$^3$
Tensile strenth: 60–70 kp./cm.$^2$
Elongation at break: 40–50%

It is to be understood that the foregoing working examples are given for the purpose of illustration and that any other suitable bicyclic amidine, organic isocyanate, organic compound containing a hydroxyl group or the like can be used therein provided that the teachings of this disclosure are followed.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:
1. The method of catalyzing the reaction between an organic isocyanate and an organic compound containing a hydroxyl group which comprises carrying out said reaction in the presence of a bicyclic amidine having the general formula

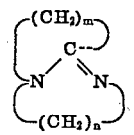

in which $m$ is a whole number from 3 to 7 and $n$ is a whole number from 2 to 4.

2. The process of claim 1 wherein said bicyclic amidine is employed in an amount of from about 0.1 to about 5% by weight based on the weight of the hydroxyl compound.

3. The process of claim 1 wherein said isocyanate is an organic polyisocyanate and said hydroxyl compound is a polyhydroxyl compound.

4. The process of claim 1 wherein said hydroxyl compound is a polyhydroxyl compound, said isocyanate is an organic polyisocyanate and a blowing agent is included in the reaction mixture to prepare a cellular polyurethane plastic.

5. The process of claim 1 wherein a tertiary amine, an organic or inorganic compound of tin, lead, titanium or iron is also used as a catalyst.

6. The process of claim 1 wherein from about 1 to 10% by weight of mineral drying agent based on the weight of the hydroxyl compound is also present in the reaction mixture.

7. The process of claim 3 wherein about 0.1 to about 5% by weight based on the weight of the polyhydroxyl compound of an alkanol amine which contains at least one primary or secondary amino group is included in the reaction mixture.

References Cited
UNITED STATES PATENTS

| | | | |
|---|---|---|---|
| 2,916,464 | 12/1959 | Ebneth et. al. | 260—2.5 |
| 2,939,851 | 6/1960 | Orchin | 260—2.5 |
| 3,156,658 | 11/1964 | Gmitter | 260—2.5 |
| 3,167,555 | 1/1965 | Farkas et al. | 260—268 |
| 3,320,238 | 5/1967 | Paquette | 260—239 |
| 3,334,088 | 8/1967 | Moffett | 260—239 |
| 3,450,648 | 6/1969 | Windemuth et al. | 260—2.5 |

FOREIGN PATENTS

| | | | |
|---|---|---|---|
| 243,374 | 2/1963 | Australia | 260—2.5 |
| 1,491,791 | 7/1967 | France | 260—333 |

OTHER REFERENCES

Product Data Bulletin of the Jefferson Chemical Company, Inc., bulletin titled "Thancat DMP," p. 1 (received 1965).

HERBERT S. COCKERAM, Primary Examiner

U.S. Cl. X.R.

260—2.5 AK, 75 NC, 77.5 AC, 251 A, 239 B, 309.6